United States Patent
Kollar et al.

(10) Patent No.: US 10,827,370 B2
(45) Date of Patent: Nov. 3, 2020

(54) AVERAGED END-USER THROUGHPUT EVALUATION

(71) Applicant: Nokia Technologies Oy, Espoo (FI)

(72) Inventors: Martin Kollar, Kosice (SK); Yizhi Yao, Beijing (CN); Malgorzata Tomala, Wroclaw (PL)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/572,715

(22) PCT Filed: May 20, 2016

(86) PCT No.: PCT/FI2016/050342
§ 371 (c)(1),
(2) Date: Nov. 8, 2017

(87) PCT Pub. No.: WO2016/189194
PCT Pub. Date: Dec. 1, 2016

(65) Prior Publication Data
US 2018/0139636 A1    May 17, 2018

Related U.S. Application Data

(60) Provisional application No. 62/165,285, filed on May 22, 2015.

(51) Int. Cl.
*H04W 24/08* (2009.01)
*H04L 12/26* (2006.01)
*H04W 24/10* (2009.01)

(52) U.S. Cl.
CPC ......... *H04W 24/08* (2013.01); *H04L 43/0888* (2013.01); *H04W 24/10* (2013.01)

(58) Field of Classification Search
None
See application file for complete search history.

(56) References Cited

U.S. PATENT DOCUMENTS

| 8,218,657 | B2 | 7/2012 | Spilo |
| 8,964,588 | B2 | 2/2015 | Chuang |
| 2007/0053331 | A1* | 3/2007 | Kolding ............ H04W 72/1236 370/338 |
| 2010/0257259 | A1* | 10/2010 | Snapir ..................... H04L 47/10 709/221 |

(Continued)

FOREIGN PATENT DOCUMENTS

| WO | 2013/040752 A1 | 3/2013 |
| WO | WO-2014171877 A1 | 10/2014 |

OTHER PUBLICATIONS

Samsung, "On Traffic volume measurement and additional throughput measurement for small data bursts in LTE"; 3GPP TSG RAN WG2 #77bis, Mar. 26-30, 2012, Jeju Island, Korea, R2-121265 (Year: 2012).*

(Continued)

*Primary Examiner* — Joseph A Bednash
(74) *Attorney, Agent, or Firm* — Harrington & Smith

(57) ABSTRACT

Methods, apparatuses, and computer program products for measuring throughput as a measure of performance and/or quality of service are provided. One method comprises, over an observation period for at least one of an uplink direction and a downlink direction, measuring an amount of padding bits in each protocol data unit (PDU) that is successfully transmitted in the said direction and that carries data relevant to a given throughput measure. The method may also comprise transforming the measured amounts of padding bits to the time domain and summing the transformed amounts of padding in the time domain. The method may also comprise utilizing the summed amount of padding in the time domain to account for small data transmissions in a calculation for the given throughput measure.

17 Claims, 10 Drawing Sheets

(56) References Cited

U.S. PATENT DOCUMENTS

| | | | |
|---|---|---|---|
| 2013/0114446 A1 | 5/2013 | Liu et al. | |
| 2013/0223249 A1 | 8/2013 | Chuang | |
| 2014/0022933 A1 | 1/2014 | Yi et al. | |
| 2016/0065285 A1* | 3/2016 | Nammi | H04B 7/0486 370/252 |
| 2016/0119813 A1* | 4/2016 | Sridhar | H04W 28/0268 370/229 |
| 2016/0261516 A1* | 9/2016 | Gopinathan | H04L 43/0876 |

OTHER PUBLICATIONS

Huawei et al., "Data Volume Issues", 3GPP TSG-RAN WG2 Meeting #78, R2-122455 (Year: 2012).*

"3rd Generation Partnership Project; Technical Specification Group Radio Access Network; Evolved Universal Terrestrial Radio Access (E-UTRA); Layer 2—Measurements (Release 12)", 3GPP TS 36.314, V12.0.0, Sep. 2014, pp. 1-20.

"3rd Generation Partnership Project; Technical Specification Group Services and System Aspects; Telecommunication management; Performance Management (PM); Performance measurements Evolved Universal Terrestrial Radio Access Network (E-UTRAN) (Release 13)", 3GPP TS 32.425, V13.1.0, Mar. 2015, pp. 1-77.

International Search Report and Written Opinion received for corresponding Patent Cooperation Treaty Application No. PCT/FI2016/050342, dated Aug. 9, 2016, 11 pages.

Extended European Search Report received for corresponding European Patent Application No. 16799410.2, dated Oct. 18, 2018, 10 pages.

* cited by examiner

AVERAGED END-USER THROUGHPUT EVALUATION

RELATED APPLICATION

This application was originally filed as Patent Cooperation Treaty Application No. PCT/FI2016/050342 filed May 20, 2016 which claims priority benefit to U.S. Provisional Patent Application No. 62/165,285, filed May 22, 2015.

TECHNOLOGICAL FIELD

The described invention relates to wireless communications, and more particularly to measuring throughput as a measure of performance and/or quality of service.

BACKGROUND

The examples herein are in the context of a wireless cellular radio network, for example E-UTRAN LTE networks, but the throughput measures herein are readily adaptable to other wireless radio access technologies. FIG. 1A is a diagram illustrating an example of an overall architecture of such an E-UTRAN LTE system. Individual mobile devices, termed UEs, access the radio network through eNBs which can communicate directly with one another by means of an X2 interface. The eNBs are also connected by means of a S1 interface to an Enhanced Packet Core (EPC), more specifically to a Mobility Management Entity (MME) by means of a S1 MME interface and to a Serving Gateway (S-GW) by means of a S1 interface. The S1 interface supports a many-to-many relationship between MMEs/S-GW and eNBs.

One metric used to evaluate the E-UTRAN's performance is data throughput. Specifically, end user throughput is one of the Key Performance Indicators (KPIs) used to monitor quality of services as perceived by that end user (e.g., any given user equipment or UE). The services provided by E-UTRAN are based on the delivery of Internet Protocol (IP) packets, and so from the end user's point of view it is important that this or any other throughput metric accurately measures what the end user perceives to be its IP throughput.

In this regard the relevant E-UTRAN specification is 3GPP TS 36.314 section 4.1.6 and TS 32.425 section 4.4.6, which defines how to measure "IP Scheduled Throughput" per quality control indicator (QCI) and per UE. In order to consider this end user throughput independent of packet size, this measurement excludes from consideration of the volume and the active time measurements the last TTI which empties the UE's buffer. Section 4.1.7 of 3GPP TS 36.314 concerns minimization of drive tests (MDTs, in which UE's provide performance measurements to the network which in previous times were taken by roving network measurement apparatus). This section extends the "Scheduled IP Throughput" of section 4.1.6 for MDT purposes and the MDT throughput measurements follow similar principles as those set forth in section 4.1.6, except the measurements are per UE and per evolved resource allocation block (E-RAB).

A problem arises in that the Scheduled IP Throughput as defined in 3GPP TS 36.314 and 32.425 intends to measure the end user throughput for the provided services using data bursts that are large enough to require transmissions to be split across several transmission time intervals (TTIs). But in case the provided services do not meet this criterion they are completely excluded from measurement and the throughput measured according to 3GPP TS 36.314 and 32.425 counts such bursts not spanning multiple TTIs as zero data.

Such small bursts may occur for example when the amount of data is not able to fill in the whole transport block (TB) and when emptying the buffer. But it is quite common in practice that traffic in the network can be dominated by very small data bursts each sent within only one TTI, and none of these small packet bursts would qualify for measurement in the existing scheduled IP throughput counters. Embodiments of these teachings resolve this issue, and one result is improved end user throughput evaluation per UE when there is a non-negligible volume of data sent with small data bursts.

SUMMARY

One embodiment is directed to a method comprising, over an observation period for at least one of an uplink direction and a downlink direction, measuring an amount of padding bits in each protocol data unit (PDU) that is successfully transmitted in the said direction and that carries data relevant to a given throughput measure. The method may also comprise transforming the measured amounts of padding bits to the time domain and summing the transformed amounts of padding in the time domain. The method may also comprise utilizing the summed amount of padding in the time domain to account for small data transmissions in a calculation for the given throughput measure.

Another embodiment is directed to an apparatus which may include at least one processor and at least one non-transitory memory including computer program code. The at least one memory and the computer program code are configured, with the at least one processor, to cause the apparatus to, over an observation period for at least one of an uplink direction and a downlink direction, measure an amount of padding bits in each protocol data unit (PDU) that is successfully transmitted in the said direction and that carries data relevant to a given throughput measure. The apparatus may also be caused to transform the measured amounts of padding bits to the time domain and summing the transformed amounts of padding in the time domain. The apparatus may also be caused to utilize the summed amount of padding in the time domain to account for small data transmissions in a calculation for the given throughput measure.

Another embodiment is directed to a computer program embodied on a program a computer readable medium. The computer program may be configured, when run a processor, to cause the processor to perform a process comprising, over an observation period for at least one of an uplink direction and a downlink direction, measuring an amount of padding bits in each protocol data unit (PDU) that is successfully transmitted in the said direction and that carries data relevant to a given throughput measure. The process may further comprise transforming the measured amounts of padding bits to the time domain and summing the transformed amounts of padding in the time domain. The process may further comprise utilizing the summed amount of padding in the time domain to account for small data transmissions in a calculation for the given throughput measure.

DETAILED DESCRIPTION

To overcome the small data burst measurement issue mentioned in the background section, some network operators estimate the end user throughput per UE with small data bursts by dividing the total transmitted packet data convergence protocol service data unit (PDCP SDU) volume with the total active UEs' time that there is data in its buffer. Experience shows that the reliability of results obtained this way depend on how many of the symbols in the TB is/are filled in with useful data, versus those filled only with padding bits.

Figure 1A:
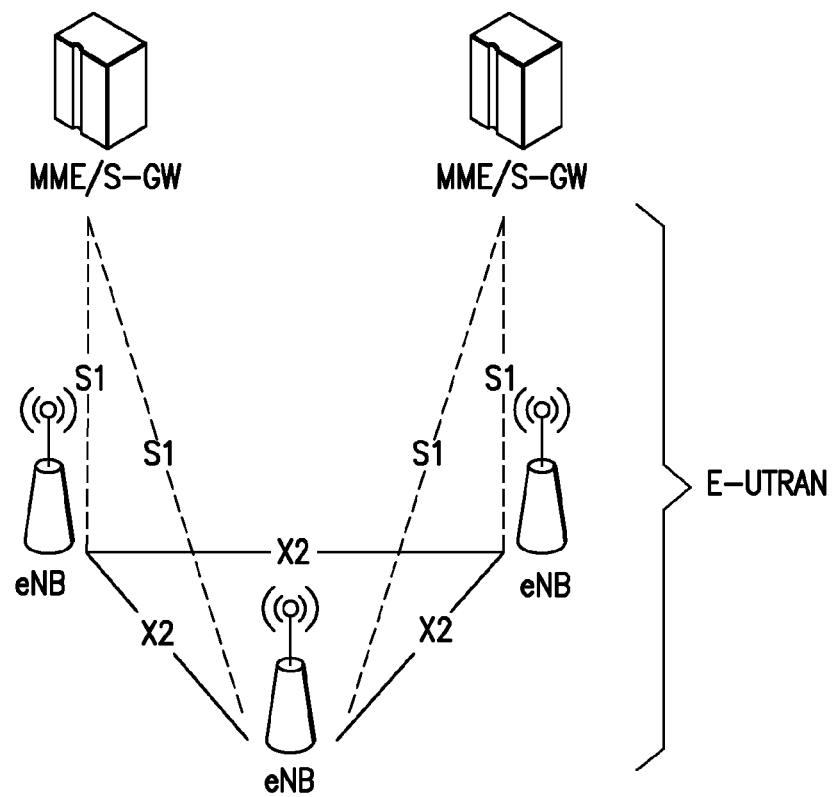
FIG. 1A is a prior art diagram illustrating an overall architecture of an E-UTRAN LTE radio system.
Figure 1B:
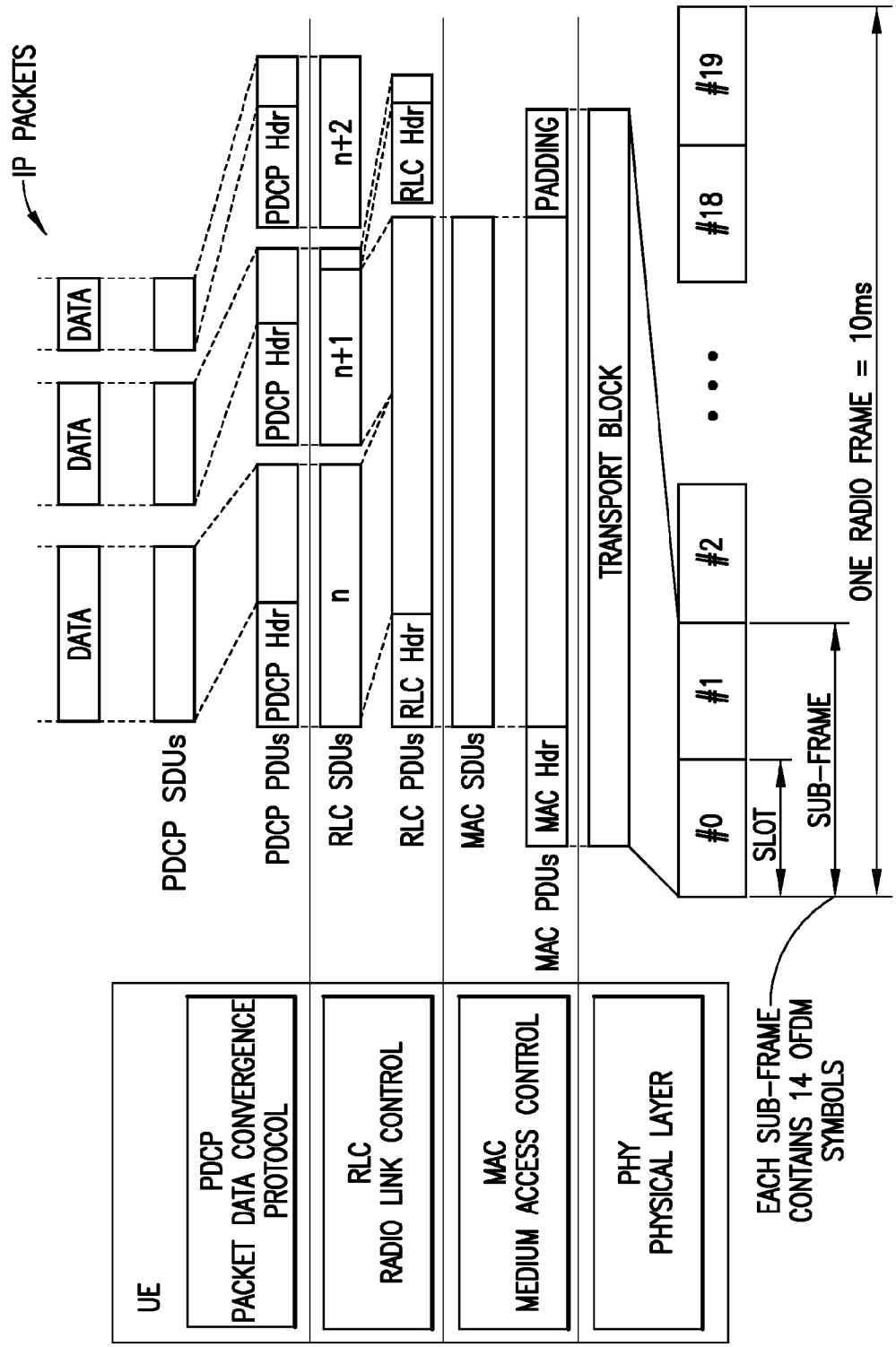
FIG. 1B is a prior art overview of logical layers in the FDD version of LTE assuming a normal-size cyclic prefix.

FIG. 1B puts this in context by illustrating the relevant data structures and shows an overview of the frequency division duplex (FDD) layers with a normal-length cyclic prefix (CP) in the LTE system. There are 14 symbols per TTI/subframe and two slots per subframe. The PDCP SDUs are shown in the PDCP layer. Consider an example where a TB to be transmitted with modulation order 4 and with only one PRB allocated and 200 added padding bits. This may be transformed to the case where approximately 4 symbols [200/(4*12)] are not carrying any useful data and therefore the useful data transmission takes only 10 symbols duration from the TTI, assuming a standard-length CP and 7 symbols per slot.

From the background section it is clear that when the network provides service to its end users it is not required that there be enough user data for transmission so as to fill in the selected TB. When the user data does not fill the TB, the portion not filled by user data is filled in with padding bits. On the medium access control (MAC) layer it appears that this TB with the whole selected size is transmitted, but in the PDCP layer the padding bits are not transformed to anywhere else and are simply discarded on the MAC layer by the eNB (for the case of uplink transmissions from the UE) and by the UE (for the case of downlink transmissions from the eNB).

It may appear that a straightforward solution would be to map the padding bits on the MAC layer to a respective amount of bits in the PDCP layer, in order to estimate what volume at the PDCP layer corresponds to the actual padding bits in the MAC layer. But in practice this would be quite challenging to obtain reliable results, considering that for the padding bits the eNB behaves like an emulator in order to obtain the corresponding PDCP volume.

Embodiments of these teachings solve the throughput measurement problem by addressing it in the time domain as opposed to the volume domain. As detailed below, specific example embodiments evaluate effective number of symbols in a given TTI corresponding to useful data transmission, and then use only those symbols for the end user throughput calculation. But note that when initially determining the amount of padding prior to transforming to the time domain, the padding bits are measured/counted per MAC PDU, not per symbol and the terminology 'amount of padding' (without stating 'bits') refers to the amount of padding after conversion to the time domain.

This approach can be summarized by the following points:

A. The measurement of the amount of padding is evaluated in the number of symbols in each successfully transmitted TB.

B. In relation to point A the measurement provides a sum related to padding evaluated in the number of symbols from all successfully transmitted TBs in the observation period, for example, 15 minutes if using the 3GPP default observation period.

C. In relation to points A and B, the measurement is done in both the UL and DL directions.

D. In relation to points A, B and C, the measurement is done only in the TTIs for which the UE has some data in the buffer. For example, in the UL direction the successfully transmitted TBs only filled with padding bits resulted from proactive UL scheduling would be completely excluded from this measurement.

E. In relation to points A, B, C and D, in DL the measurement is done for each successfully transmitted TB regardless of whether that TB is related to a first/original transmission or to a re-transmission.

F. In relation to point E, for the case of spatial multiplexing with two codewords the measurement is done as an average amount of padding evaluated in the number of symbols per codeword.

G. This technique can be used to measure the average IP throughput per UE, average IP throughput per QCI, and/or average IP throughput per cell (where the cell represents one eNB with or without its remote radio heads if any, one relay node, or the like).

i. To measure the averaged IP throughput per UE, the end user throughput per UE [in kilobits per second, kbps] can then be calculated as follows:

the end user throughput per UE=the PDCP SDU volume of the cell [bits]/(total active UE's time with data in its buffer [TTIs]−total amount of padding [symbols]/14), where the total amount of padding represents the sum of the amount of padding in the number of symbols from all successfully transmitted TBs in the observation period.

ii. To measure the averaged IP throughput per QCI, the end user throughput per QCI [in kbps] can then be calculated as follows:

the end user throughput per QCI=the PDCP SDU volume of the QCI/(active UEs time with data of the QCI in the buffer [TTIs]−amount of padding of the QCI [symbols]/14), where the amount of padding of the QCI represents the estimated sum of the amount of padding in the number of symbols for the QCI from all successfully transmitted TBs in the observation period. However, the padding bits are added per TB which is per UE but not QCI, so the amount of padding per QCI can be estimated by:
a) "PDCP SDU volume of the QCI"/"PDCP SDU volume of the cell"*"total amount of padding", where "PDCP SDU volume of the QCI" and "PDCP SDU volume of the cell" represents the volume from the whole observation period;
OR
b) There can be more accurate way for estimation which may be more complex, which is x) to estimate the padding for the QCI in each UE active TTI with the data of the QCI in the buffer, by means of "PDCP SDU volume of the QCI"/ "PDCP SDU volume"*"amount of padding" of each UE active TTI with the data of the QCI in the buffer; and then y) to take the sum of the result of x) (the padding for the QCI in each UE active TTI with the data of the QCI in the buffer) to get the total amount of padding of the QCI in the observed period.

iii. To measure the averaged IP throughput per cell, the cell IP throughput [kbps] is then calculated as follows:

the cell IP throughput=Total PDCP SDU volume of the cell of all UEs [bits]/(Total active time of the cell with data in the buffer [TTIs]−sum of minimal padding [symbols]/14).

Figure 2:
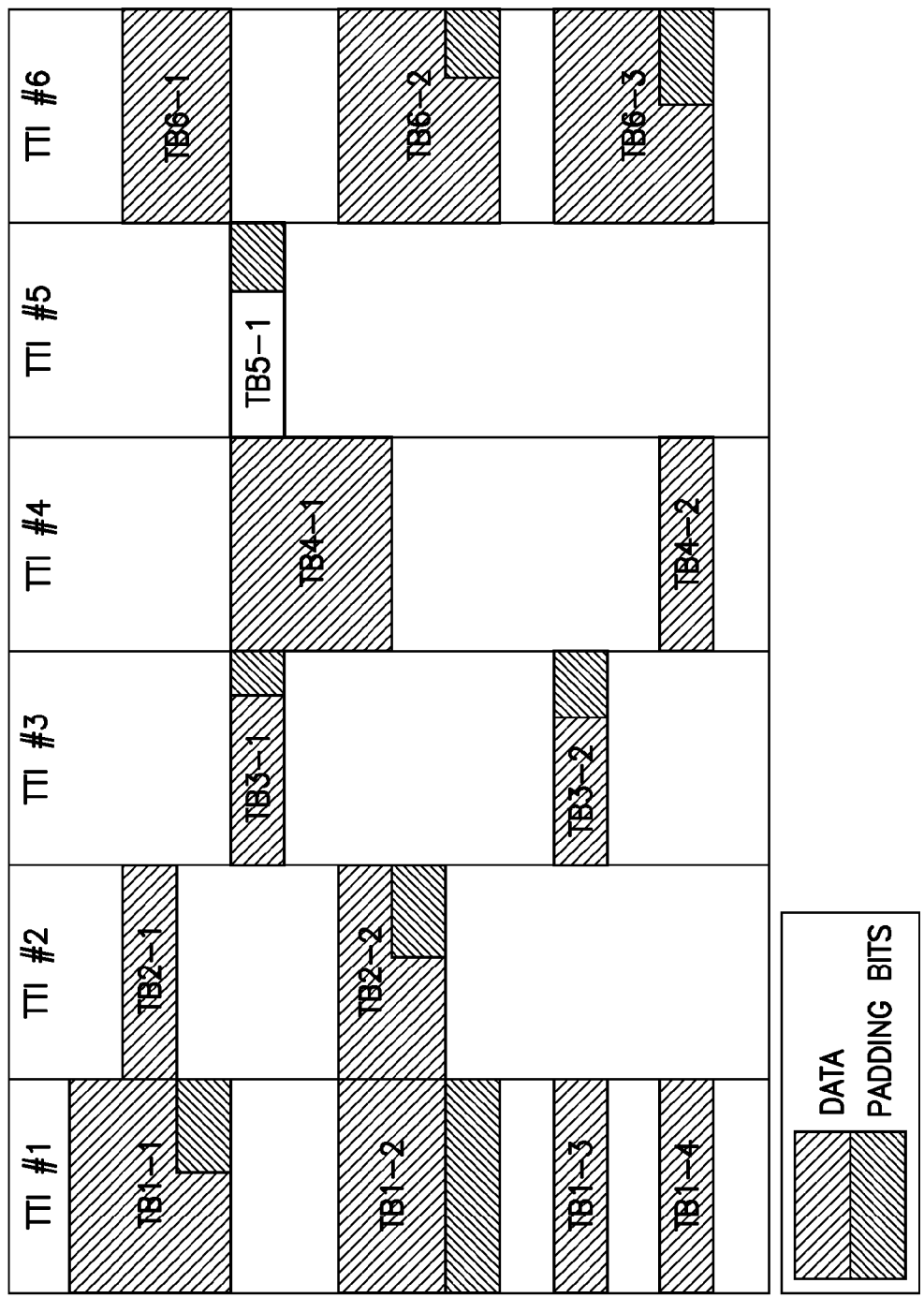
FIG. 2 is a table showing an exemplary transmission diagram according to certain aspects of these teachings.

For the sum of minimal padding [symbols], in the given TTI padding will only be considered if all the TBs for all the UEs scheduled in this TTI contained padding bits. So the sum of minimal padding [symbols]/represents the sum of minimal padding of the TTI in the number of symbols from all successfully transmitted TBs in the observed period. For instance, assuming the data transmission diagram shown at FIG. 2, the Total active time with data in the buffer [TTIs] is 6; so the sum of minimal padding [symbols]:

=Σminimal padding [symbols]

=minimal padding [symbols] in TTI #3+minimal padding [symbols] in TTI #5

=min {padding [symbols] for TB3-1, padding [symbols] for TB3-2}+padding [symbols] in TB5-1

=min {padding bits of TB3-1/(# PRB for TB3-1*12*Modulation order), padding bits of TB3-2/(# PRB for TB3-2*12*Modulation order)}+ padding bits of TB5-1/(# PRB for TB5-1*12*Modulation order)

The above technique does not necessarily replace the Scheduled IP Throughput as defined in 3GPP TS 36.314 and 32.425, it can be used to fill in the current gap for end user throughput measurement per UE with small data bursts where the 3GPP defined throughput does not seem to be applicable. Meanwhile and as shown above, the method also covers the case for measuring the cell IP throughput, and averaged UE throughput.

Figure 3:
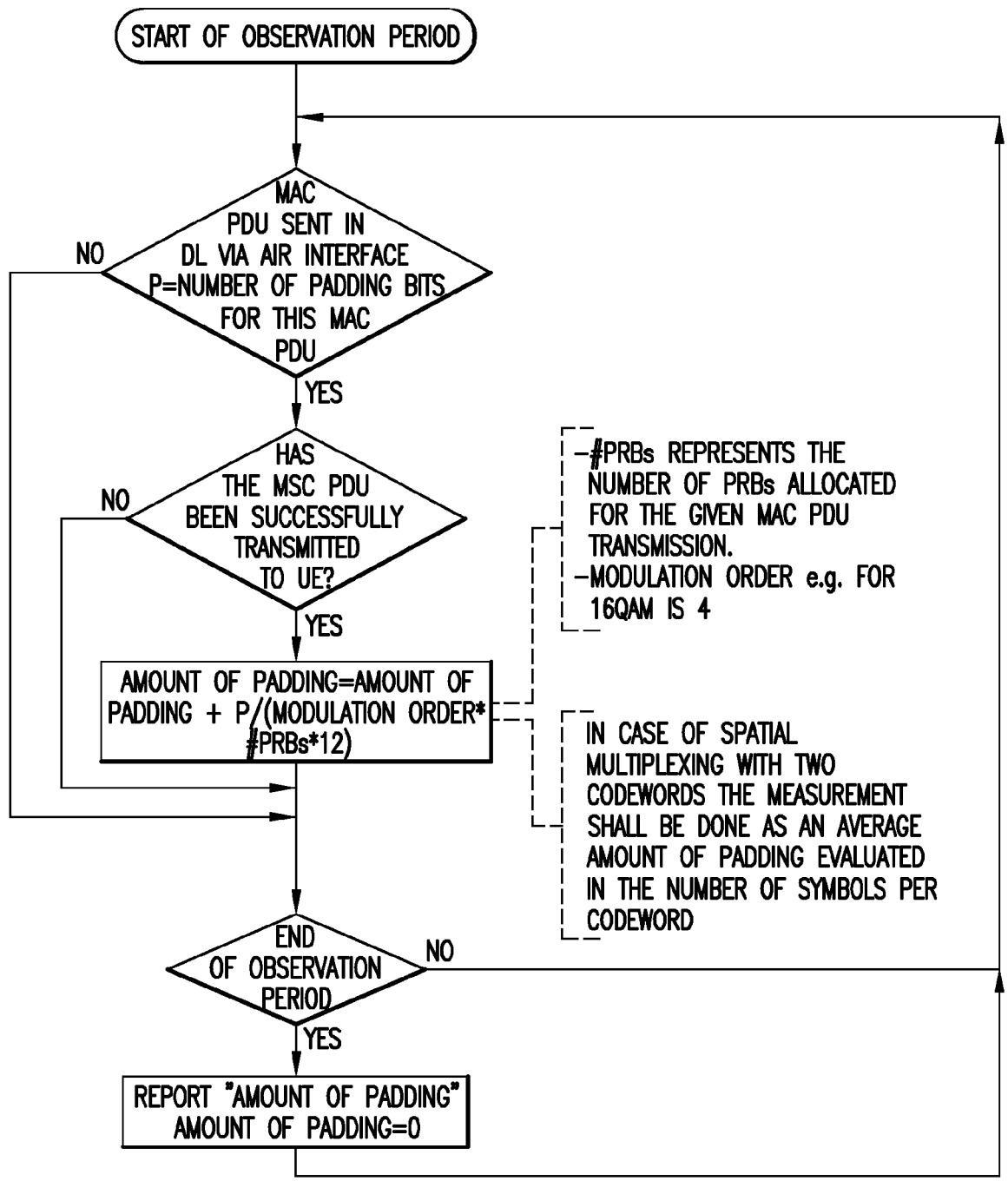
FIG. 3 is a flow diagram illustrating how to measure an amount of padding bits per UE in the downlink direction according to a particular aspect of these teachings.
Figure 4:
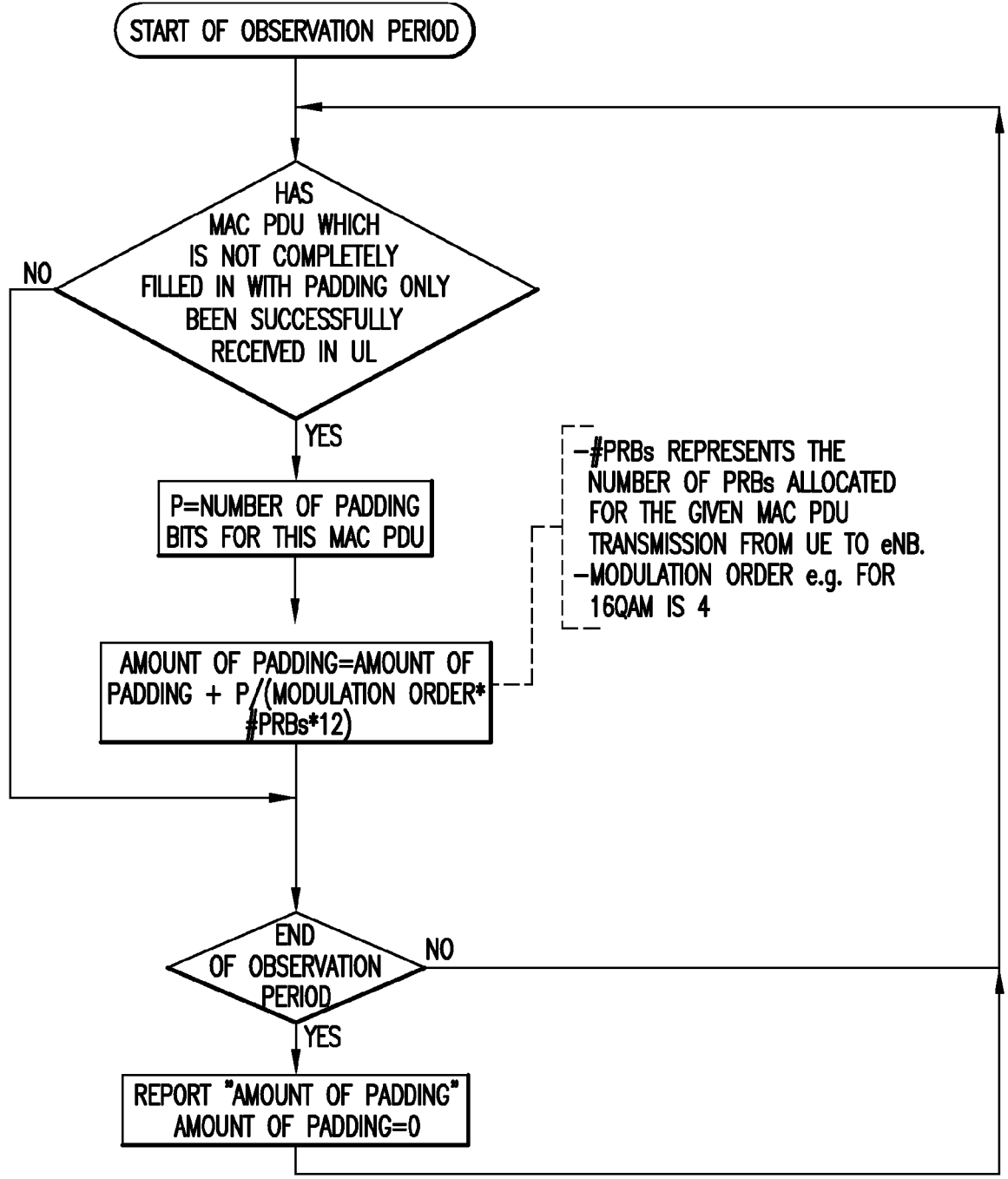
FIG. 4 is a flow diagram illustrating how to measure an amount of padding bits per UE in the uplink direction according to a particular aspect of these teachings.
Figure 5:
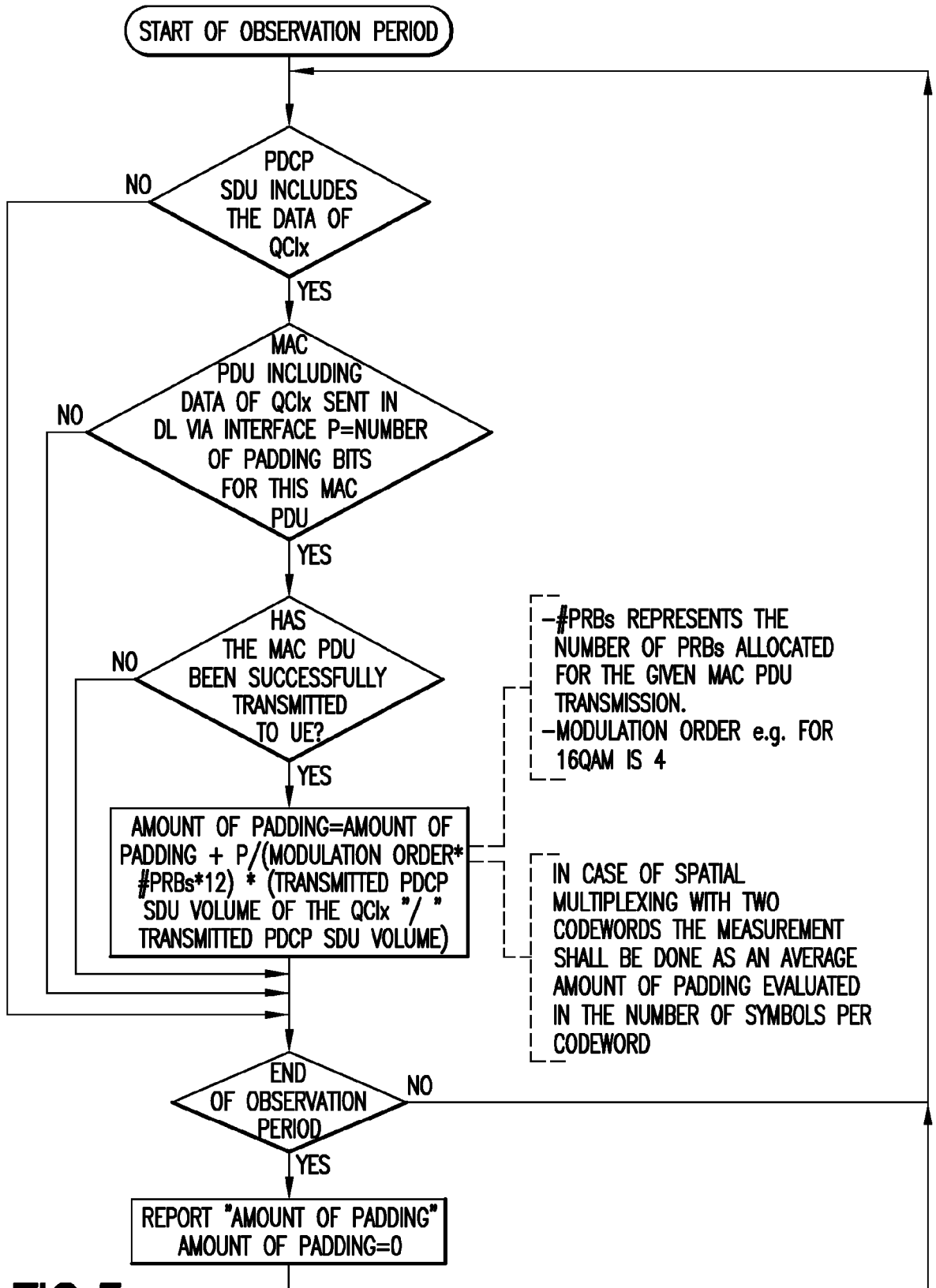
FIG. 5 is a flow diagram illustrating how to measure an amount of padding bits per CQI level in the downlink direction according to a particular aspect of these teachings.
Figure 6:
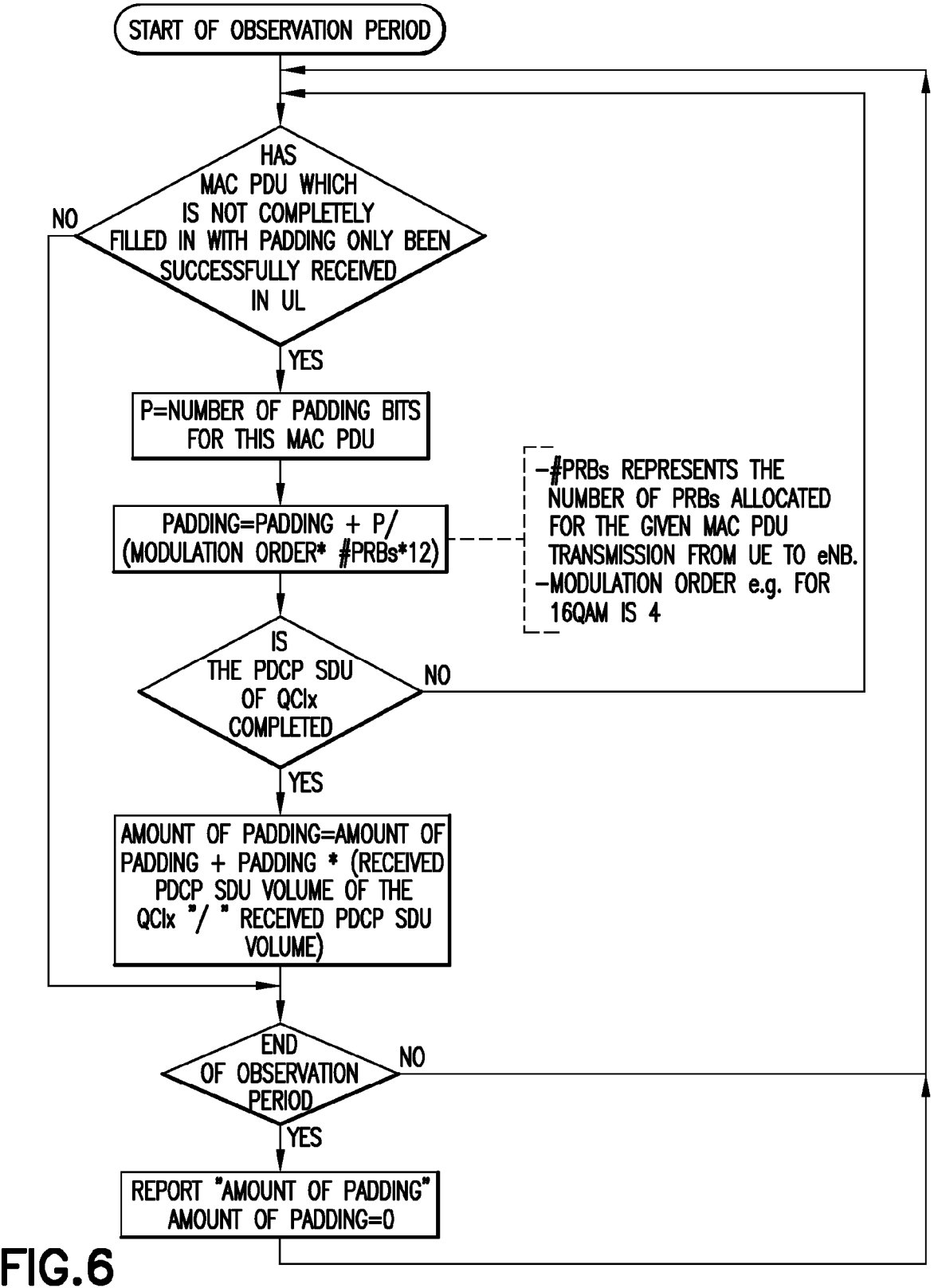
FIG. 6 is a flow diagram illustrating how to measure an amount of padding bits per CQI level in the uplink direction according to a particular aspect of these teachings.
Figure 7:
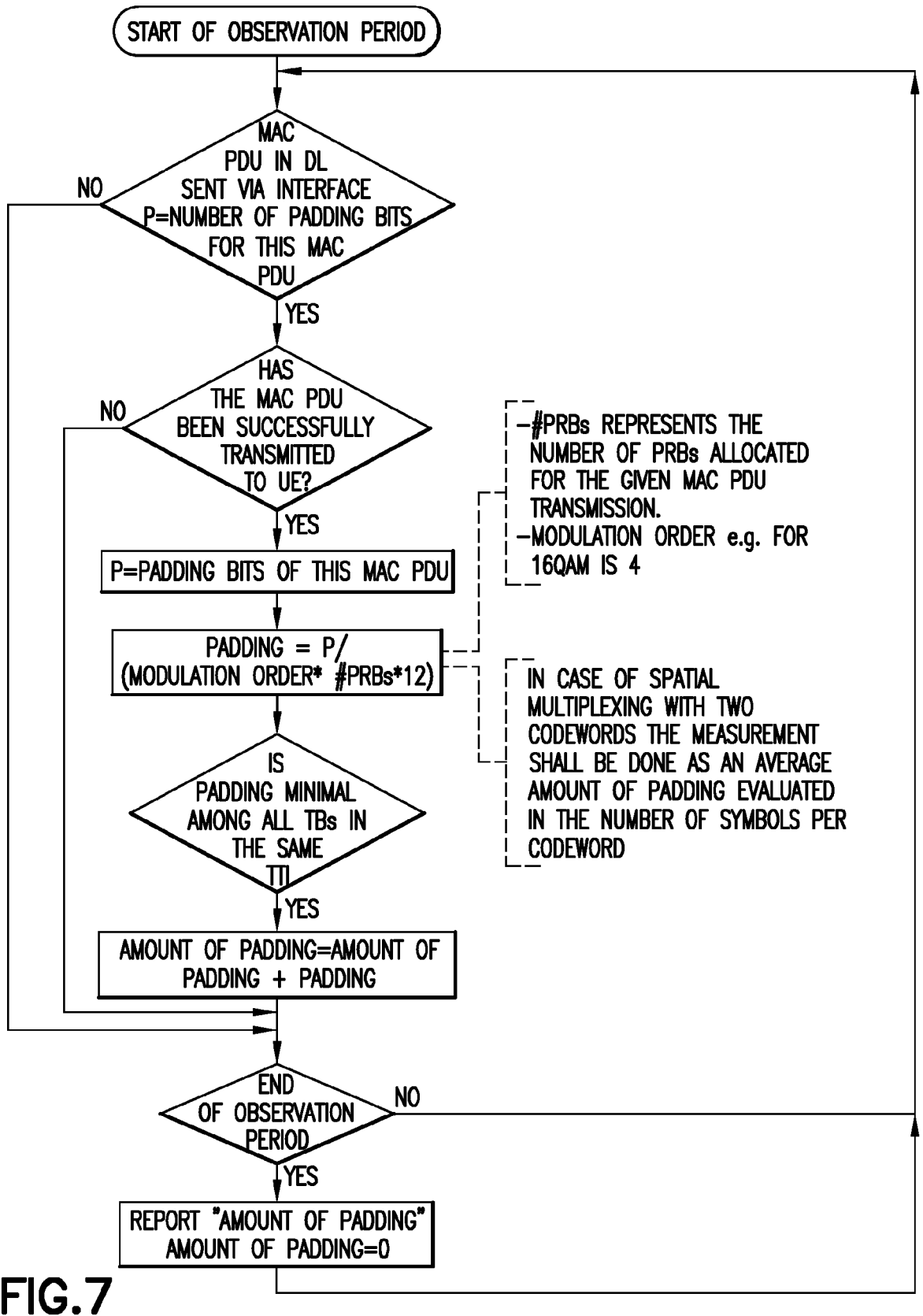
FIG. 7 is a flow diagram illustrating how to measure an amount of padding bits per cell in the downlink direction according to a particular aspect of these teachings.
Figure 8:
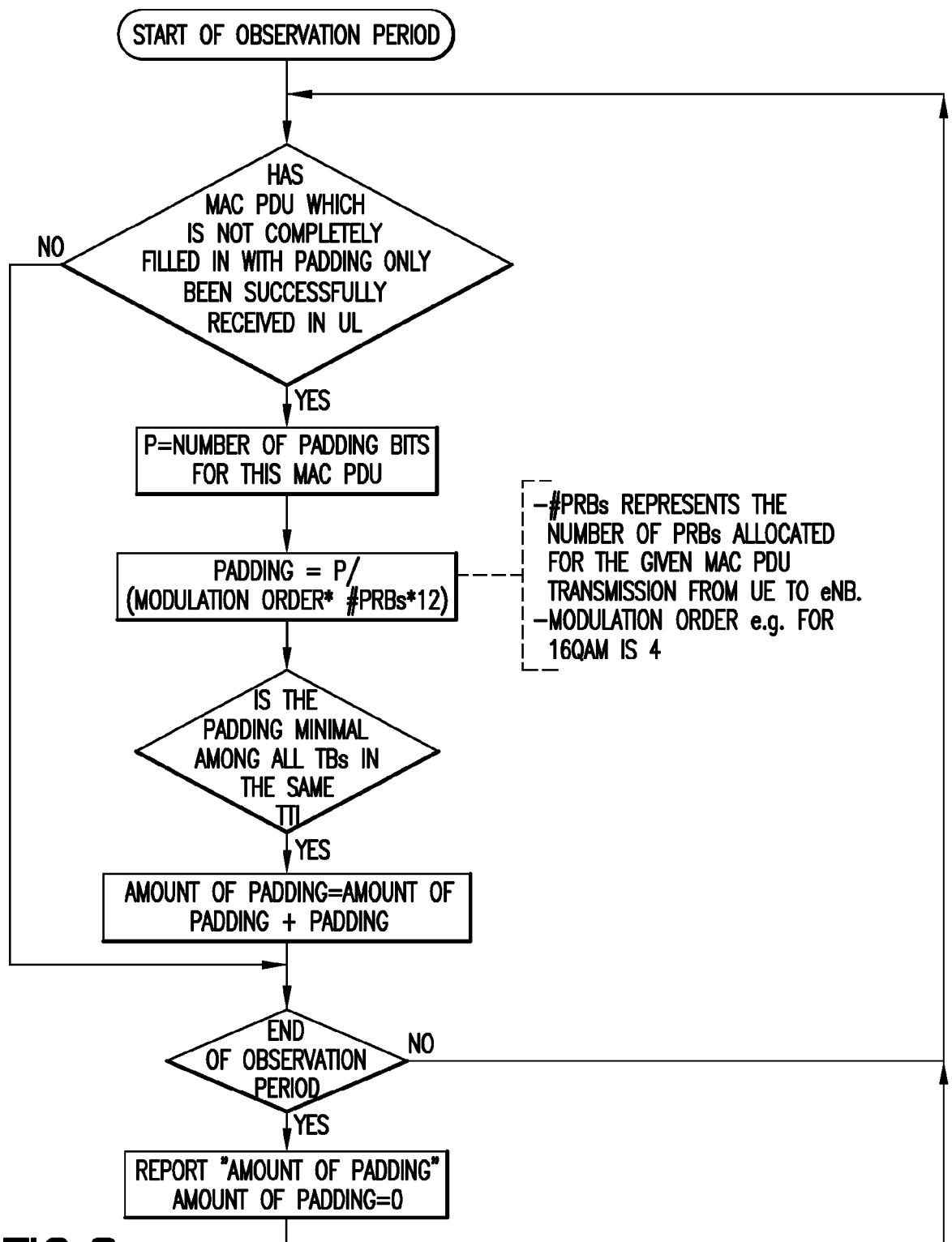
FIG. 8 is a flow diagram illustrating how to measure an amount of padding bits per cell in the uplink direction according to a particular aspect of these teachings.

FIGS. 3-8 are flow diagrams showing the above points with more particularity; FIGS. 3-4 illustrate a process flow diagram/algorithm for calculating/measuring an amount of padding per UE in the respective downlink (DL) and uplink (UL) directions; FIGS. 5-6 illustrate a process flow diagram/ algorithm for calculating/measuring an amount of padding per CQI level in the respective downlink (DL) and uplink (UL) directions; and FIGS. 7-8 illustrate a process flow diagram/algorithm for calculating/measuring an amount of padding per cell in the respective downlink (DL) and uplink (UL) directions.

These flow diagrams represent steps of a method, and/or certain code segments of software stored on a computer readable memory that embody the algorithm shown in those diagrams for finding the amount of padding that can account for small data transmissions, and actions taken by a communications entity such as a node of the LTE or other type of network when executing such software where such an entity does the throughput computations for average throughput per UE, throughput per QCI level, and/or throughput per cell.

Figure 9:
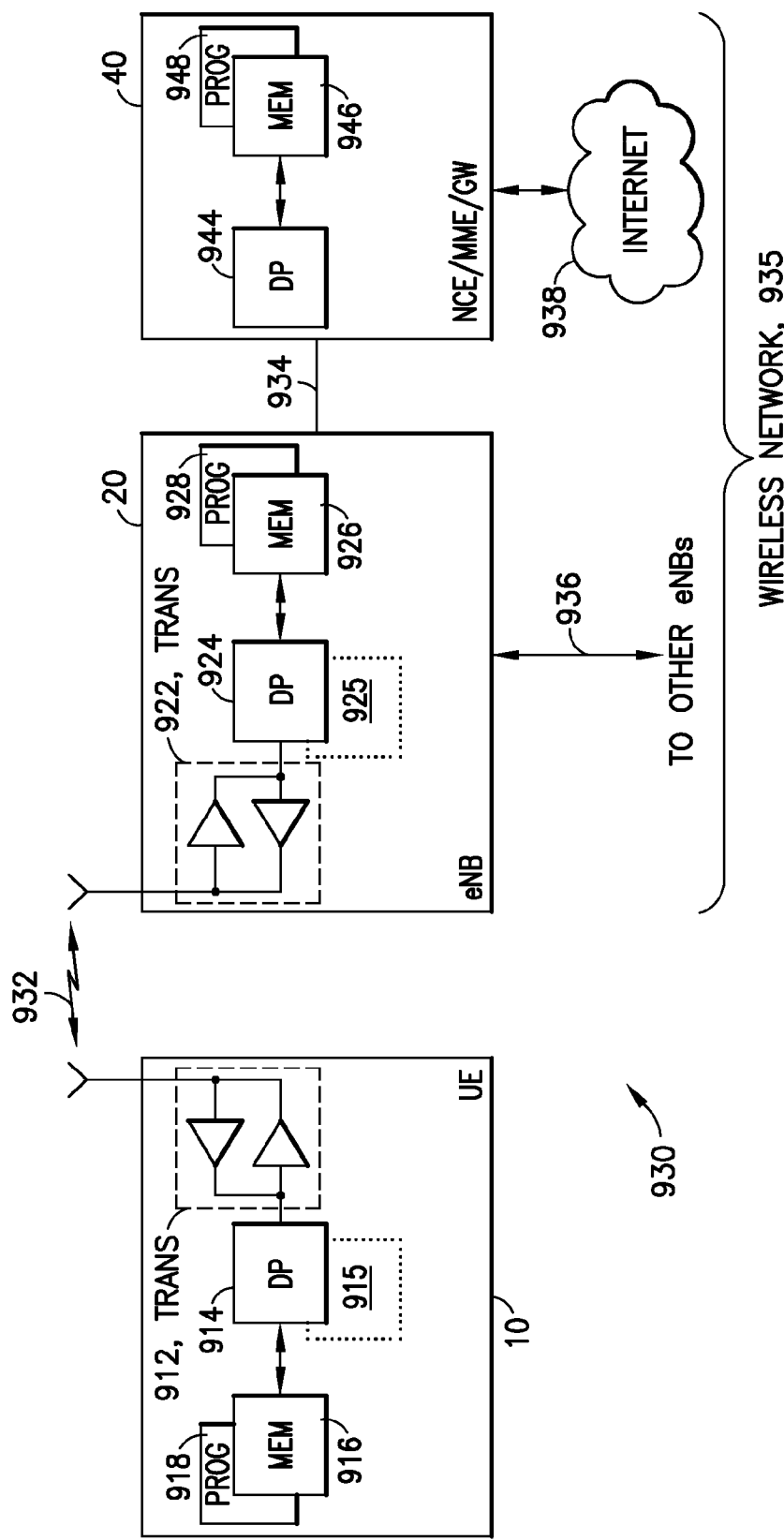
FIG. 9 is a diagram illustrating some components of the UE, eNB and MME shown at FIG. 1A that are suitable for practicing the invention.

In that regard FIG. 9 is a high level diagram illustrating some components of the communication entities shown at FIG. 1, and additionally a user equipment (UE). In the wireless system 930 of FIG. 9 a wireless network 935 is adapted for communication over a wireless link 932 with an apparatus, such as a mobile communication device which may be referred to as a UE 10, via a network access node, such as a Node B (base station), and more specifically an eNB 20. The network 935 may include a network control element (NCE) 940 that may include MME/S-GW functionality, and which provides connectivity with a network, such as a telephone network and/or a data communications network (e.g., the internet 938).

The UE 10 includes a controller, such as a computer or a data processor (DP) 914 (or multiple ones of them), a computer-readable memory medium embodied as a memory (MEM) 916 that stores a program of computer instructions (PROG) 918, and a suitable wireless interface, such as radio frequency (RF) transceiver 912, for bidirectional wireless communications with the eNB 20 via one or more antennas.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The eNB 20 also includes a controller, such as a computer or a data processor (DP) 924 (or multiple ones of them), a computer-readable memory medium embodied as a memory (MEM) 926 that stores a program of computer instructions (PROG) 928, and a suitable wireless interface, such as RF transceiver 922, for communication with the UE 10 via one or more antennas. The eNB 20 is coupled via a data/control path 934 to the NCE 40. The path 934 may be implemented as an interface. The eNB 20 may also be coupled to another eNB via data/control path 936, which may be implemented as an interface.

The NCE 940 includes a controller, such as a computer or a data processor (DP) 944 (or multiple ones of them), a computer-readable memory medium embodied as a memory (MEM) 946 that stores a program of computer instructions (PROG) 948.

At least one of the PROGs 918, 928 and 948 is assumed to include program instructions that, when executed by the associated one or more DPs, enable the device to operate in accordance with exemplary embodiments of this invention, as will be discussed below in greater detail. That is, various exemplary embodiments of this invention may be implemented at least in part by computer software executable by the DP 914 of the UE 10; by the DP 924 of the eNB 20; and/or by the DP 944 of the NCE 40, or by hardware, or by a combination of software and hardware (and firmware).

For the purposes of describing various exemplary embodiments in accordance with this invention the UE 10 and the eNB 20 may also include dedicated processors, for example RRC module 915 and a corresponding RRC module 925.

The computer readable MEMs 916, 926 and 946 may be of any type suitable to the local technical environment and may be implemented using any suitable data storage technology, such as semiconductor based memory devices, flash memory, magnetic memory devices and systems, optical memory devices and systems, fixed memory and removable memory. The DPs 914, 924 and 944 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 912 and 922) may be of any type suitable to the local technical environment and may be implemented using any suitable communication technology such as individual transmitters, receivers, transceivers or a combination of such components.

A computer readable medium may be a computer readable signal medium or a non-transitory computer readable storage medium/memory. A non-transitory computer readable storage medium/memory does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium/memory would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

A communications system and/or a network node/base station may comprise a network node or other network elements implemented as a server, host or node operationally coupled to a remote radio head. At least some core functions may be carried out as software run in a server (which could be in the cloud) and implemented with network node functionalities in a similar fashion as much as possible (taking latency restrictions into consideration). This is called network virtualization. "Distribution of work" may be based on a division of operations to those which can be run in the cloud, and those which have to be run in the proximity for the sake of latency requirements. In macro cell/small cell networks, the "distribution of work" may also differ between a macro cell node and small cell nodes. Network virtualization may comprise the process of combining hardware and software network resources and network functionality into a single, software-based administrative entity, a virtual network. Network virtualization may involve platform virtualization, often combined with resource virtualization. Network virtualization may be categorized as either external, combining many networks, or parts of networks, into a virtual unit, or internal, providing network-like functionality to the software containers on a single system.

At this time but without limitation to the broader teachings herein it is expected the network would be more suitable for practicing these teachings than the UE 10. Throughput calculations according to the algorithms and more general principles set forth above may be computed by the eNB 20, by the NCE 40, or by other network nodes not directly involved with signaling over the radio access network, using information provided by one or more of the entities shown at FIG. 9. For the downlink calculations, the relevant buffer is in the eNB 20 and for the DL per UE measurements the eNB has a buffer for each UE it is currently serving. For the uplink calculations the relevant buffer is in the UE 10, and the eNB can learn when there is data in that buffer within the UE for certain of the calculations shown above from the UE itself, such as for example through buffer status reports the UE sends uplink or other forms of requests by the UE for uplink resources over which to send its buffered data.

What is claimed is:

1. A method comprising:

during an observation period for a service provided in at least one of an uplink direction from user equipment or a downlink direction from a base station, measuring an amount of padding volume to determine a measured amount of padding volume in each protocol data unit that is successfully transmitted in the said at least one of the uplink direction or the downlink direction and that carries data relevant to a given throughput measure, wherein the each protocol data unit is a medium access control protocol data unit of more than one medium access control protocol data unit;

transforming the measured amount of padding volume in each protocol data unit to a time domain and summing the transformed amount of padding volume in the time domain to determine a summed amount of padding volume according to a modulation order and number of physical resource blocks used in each at least one transmission time interval in a respective medium access control protocol data unit of the more than one medium access control protocol data unit for the user equipment;

utilizing the measured amount of padding volume in the time domain to account for at least one small data transmission in a calculation for the given throughput measure related to the at least one small data transmission, wherein a small data transmission comprises a data transmission that does not fill a transport block; and based on the calculation for the given throughput measure, determining whether network provided services to the user equipment support the given throughput measure for the user equipment.

2. The method according to claim 1, wherein:
the calculation for the given throughput measure, when utilizing the summed amount of padding volume, accounts for data that is transmitted in bursts spanning at least one transmission time interval.

3. The method according to claim 2, wherein in case of spatial multiplexing with two codewords measuring the amount of padding volume comprises determining an average amount of padding volume per codeword.

4. The method according to claim 1, wherein:
the given throughput measure is average throughput per user equipment; and
each of the said more than one medium access control protocol data unit characterized by there being data in a buffer of the user equipment buffer for said direction.

5. The method according to claim 4, wherein an end user throughput for the user equipment is calculated as follows:
the end user throughput equals a packet data convergence protocol service data unit volume of the cell transmission bits divided by a total active time of the user equipment with data in its buffer at transmission time intervals minus a total amount of padding volume symbols, where the total amount of padding volume symbols represents the sum of the amount of padding in the number of symbols from all successfully transmitted transport blocks in the observation period.

6. The method according to claim 1, wherein:
the given throughput measure is throughput per quality control indication level; and measuring an amount of padding in each of a given ones of the protocol data units comprises adjusting an accumulated number of padding volume in the given protocol data unit to account for modulation order and number of physical resource blocks occupied by the protocol data unit, and to account for transmitted volume of the given protocol data unit relative to a transmitted volume of a packet data convergence protocol service data unit carrying the given protocol data unit.

7. The method according to claim 1, wherein:
the given throughput measure is throughput per cell; and
each of the protocol data units that carries data relevant to the given throughput measure is restricted to those protocol data units in a transmission time interval for which all transport blocks for all scheduled user equipments contain padding volume.

8. The method according to claim 7, wherein the throughput per cell is cell IP throughput in kbps and is calculated as follows:
the cell IP throughput equals a total packet data convergence protocol service data unit volume of the cell of all user equipment transmission bits divided by a total active time of the cell with data in the buffer at transmission time intervals minus a sum of padding symbols.

9. A non-transitory program storage device readable by a machine, tangibly embodying a program of instructions executable by the machine for performing operations comprising:
during an observation period for a service provided in at least one of an uplink direction from a user equipment or a downlink direction, measuring an amount of padding volume to determine a measured amount of padding volume in each protocol data unit that is successfully transmitted in the said at least one of the uplink direction or the downlink direction and that carries data relevant to a given throughput measure, wherein the each protocol data unit is a medium access control protocol data unit of more than one medium access control protocol data unit;
transforming the measured amounts of padding volume in each protocol data unit to a time domain and summing the transformed amount of padding in the time domain to determine a summed amount of padding volume according to a modulation order and number of physical resource blocks used in each at least one transmission time interval in a respective medium access control protocol data unit of the more than one medium access control protocol data unit for the user equipment;
utilizing the measured amount of padding in the time domain to account for small data transmission in a calculation for the given throughput measure related to the at least one small data transmission, wherein a small data transmission comprises a data transmission that does not fill a transport block; and
based on the calculation for the given throughput measure, determining whether network provided services to the user equipment support the given throughput measure for the user equipment.

10. An apparatus comprising:
at least one processor; and
at least one non-transitory memory including computer program code, the at least one memory and the computer program code configured, with the at least one processor, to cause the apparatus to:
during an observation period for a service provided in at least one of an uplink direction from a user equipment and a downlink direction from a base station, measure an amount of padding volume to determine an amount of padding volume in each protocol data unit that is successfully transmitted in the said at least one of the uplink direction or the downlink direction and that carries data relevant to a given throughput measure, wherein the each protocol data unit is a medium access control protocol data unit of more than one medium access control protocol data unit;
transform the measured amounts of padding volume in each protocol data unit to a time domain and summing the transformed amount of padding in the time domain to determine a summed amount of padding volume according to a modulation order and number of physical resource blocks used in each at least one transmission time interval in a respective medium access control protocol data unit of the more than one medium access control protocol data unit for the user equipment;
utilize the measured amount of padding in the time domain to account for small data transmission in a calculation for the given throughput measure related to the small data transmission, wherein a small data transmission comprises a data transmission that does not fill a transport block; and
based on the calculation for the given throughput measure, determining whether network provided services to the user equipment support the given throughput measure for the user equipment.

11. The apparatus according to claim 10, wherein:
the calculation for the given throughput measure, when utilizing the summed amount of padding volume, accounts for data that is transmitted in bursts spanning at least one transmission time interval.

12. The apparatus according to claim 11, wherein in case of spatial multiplexing with two codewords, the at least one memory and the computer program code are configured, with the at least one processor, to cause the apparatus to measure the amount of padding volume by at least determining an average amount of padding volume per codeword.

13. The apparatus according to claim 10, wherein:
the given throughput measure is average throughput per user equipment; and each of the more than one medium access control protocol data unit characterized by there being data in a buffer of the user equipment buffer for the said direction.

14. The apparatus according to claim 13, wherein the at least one memory and the computer program code are configured, with the at least one processor, to cause the apparatus to calculate an end user throughput per user equipment as follows: the end user throughput per user equipment equals a packet data convergence protocol service data unit volume of the cell transmission bits divided by a total active time of the user equipment with data in its buffer at transmission time intervals minus a total amount of padding volume symbols, where the total amount of padding volume symbols represents the sum of the amount of padding in the number of symbols from all successfully transmitted transport blocks in the observation period.

15. The apparatus according to claim 10, wherein:
the given throughput measure is throughput per quality control indication level; and the at least one memory and the computer program code are configured, with the at least one processor, to cause the apparatus to measure an amount of padding in each of a given ones of the protocol data units by adjusting an accumulated number of padding volume in the given protocol data unit to account for modulation order and number of physical resource blocks occupied by the protocol data unit, and to account for transmitted volume of the given protocol data unit relative to a transmitted volume of a packet data convergence protocol service data unit carrying the given protocol data unit.

16. The apparatus according to claim 10, wherein:
the given throughput measure is throughput per cell; and each of the protocol data units that carries data relevant to the given throughput measure is restricted to those protocol data units in a transmission time interval for which all transport blocks for all scheduled user equipments contain padding volume.

17. The apparatus according to claim 16, wherein the throughput per cell is cell IP throughput in kbps and is calculated as follows: the cell IP throughput equals a total packet data convergence protocol service data unit volume of the cell of all user equipment transmission bits divided by a total active time of the cell with data in the buffer at transmission time intervals minus a sum of padding symbols.

* * * * *